(12) United States Patent
Laursen

(10) Patent No.: US 8,833,291 B2
(45) Date of Patent: Sep. 16, 2014

(54) INDICATOR APPARATUS FOR A WIND TURBINE TOWER WALL

(75) Inventor: Christian Laursen, Hedensted (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/582,545

(22) PCT Filed: Jun. 9, 2010

(86) PCT No.: PCT/EP2010/058057
§ 371 (c)(1), (2), (4) Date: Oct. 17, 2012

(87) PCT Pub. No.: WO2011/110236
PCT Pub. Date: Sep. 15, 2011

(65) Prior Publication Data
US 2013/0202410 A1  Aug. 8, 2013

(30) Foreign Application Priority Data
Mar. 12, 2010  (EP) ..................................... 10156329

(51) Int. Cl.
G01L 25/00 (2006.01)
G01B 5/30 (2006.01)
F03D 11/00 (2006.01)
G01B 5/14 (2006.01)

(52) U.S. Cl.
CPC .............. *F03D 11/0091* (2013.01); *G01B 5/30* (2013.01); *G01B 5/14* (2013.01)
USPC ........................................... 116/212; 52/105

(58) Field of Classification Search
USPC .................. 415/118; 416/61, 244 R, DIG. 6; 116/200, 203, 212, DIG. 34; 73/820, 73/821, 834, 835; 52/96, 99, 105, 167.1, 52/167.2, 167.3, 167.4, 167.5, 167.6, 52/167.7, 167.8, 167.9; 405/135, 151, 405/152, 153, 283
See application file for complete search history.

(56) References Cited

U.S. PATENT DOCUMENTS

| | | | | |
|---|---|---|---|---|
| 3,515,091 A * | 6/1970 | Smith | ............................ | 116/203 |
| 3,576,987 A * | 5/1971 | Voight et al. | .................... | 362/34 |
| 4,580,520 A | 4/1986 | Archer | | |
| 4,698,623 A * | 10/1987 | Smith | ............................ | 340/665 |
| 6,065,847 A * | 5/2000 | Palmer et al. | .................... | 362/34 |
| 2008/0255462 A1* | 10/2008 | Bride | ............................ | 600/476 |
| 2009/0021019 A1* | 1/2009 | Thomsen | ......................... | 290/55 |
| 2009/0207582 A1 | 8/2009 | Coyne | | |
| 2012/0275142 A1* | 11/2012 | Lundy | ............................ | 362/184 |

FOREIGN PATENT DOCUMENTS

| | | |
|---|---|---|
| CN | 101328864 A | 12/2008 |
| CN | 101476536 A | 7/2009 |
| CN | 101539095 A | 9/2009 |
| EP | 2006471 A1 | 12/2008 |
| FR | 2784178 A1 | 4/2000 |
| GB | 2246863 A | 2/1992 |

\* cited by examiner

*Primary Examiner* — William Gilbert
*Assistant Examiner* — Kyle Walraed-Sullivan

(57) ABSTRACT

Disclosed is an indicator apparatus for indicating a displacement of two segments, in particular two wall segments of a wind turbine tower wall, relative to each other, the indicator apparatus comprising: a body; a first connection element mounted at the body and adapted to be connected to a first segment; and a second connection element mounted at the body and adapted to be connected to a second segment, wherein the body is configured to generate information indicative of a relative displacement of the first connection element and the second connection element.

5 Claims, 4 Drawing Sheets

_US 8,833,291 B2_

INDICATOR APPARATUS FOR A WIND TURBINE TOWER WALL

FIELD OF INVENTION

The present invention relates to an indicator apparatus for indicating a displacement of two segments, in particular two wall segments, of a wind turbine tower wall relative to each other, to a wall portion for a tower of a wind turbine comprising the indicator apparatus, and to a tower wall of a wind turbine tower comprising the wall portion. In particular, the present invention relates to an indicator apparatus for indicating a displacement of two wall segments of a segmented wind turbine tower wall relative to each other.

ART BACKGROUND

EP 2 006 471 A1 discloses a wind turbine tower comprising a number of segments with a polygonal cross-section, wherein each segment comprises a number of flat steel plates which are connected to each other so as to form the polygonal cross-section. Thereby, two plates are connected using a splice plate and using bolts to fix the splice plate at the flat steel plates of the segments.

However, it has been observed that a segmented wind turbine tower wall may have reduced stability under certain conditions and/or after longer operation times.

There may be a need for an apparatus to indicate a reduction of the stability of a wind turbine tower wall. Further, there may be a need for an apparatus for indicating a reason for a reduced stability of a wind turbine tower wall.

SUMMARY OF THE INVENTION

This need may be met by the subject matter according to the independent claims. Advantageous embodiments of the present invention are described by the dependent claims.

According to an embodiment an indicator apparatus for indicating a displacement of two segments, in particular two wall segments, of a wind turbine tower wall, relative to each other is provided, wherein the indicator apparatus comprises a body; a first connection element mounted at the body and adapted to be connected to a first segment; and a second connection element mounted at the body and adapted to be connected to a second segment, wherein the body is configured to generate information indicative of a relative displacement of the first connection element and the second connection element.

In particular the first segment may be a first wall segment and the second segment may be a second wall segment for a tower wall of a wind turbine.

The indicator apparatus may in particular be adapted to be used as a slip indicator for shear loaded bolted joints connecting different segments of a wind turbine tower wall. In particular, the indicator apparatus may provide a visual monitoring of occurred slip in a bolted joint, i.e. an indication of whether a bolt joint has been exposed to slip (displacement) due to loads exceeding the friction level of the bolt joint, wherein thereby the bolt is plastically deformed/elongated resulting in a decrease of pre-stress in the joint.

The body may comprise a structure or construction having the first connection element mounted at one end of the body and having the second connection element mounted at another end of the body. In particular, an extent of the body may be such that the first connection element may be connected to the first segment (in particular wall segment) and the second connection element may be connected to the second segment (in particular wall segment) spaced apart from the first segment (in particular wall segment). Thus, the first connection element and the second connection element may be spaced apart by a distance (such as larger than 5 cm, larger than 10 cm, larger than 20 cm) to be connected to adjacent wall segments of a segmented wind turbine tower wall.

The first connection element and/or the second connection element may comprise a steel plate or a steel clip having a bore for connecting the first connection element and/or the second connection element by a bolt inserted into the bore of the steel clip to the respective segment (in particular wall segment). The first connection element and/or the second connection element may be connectable to a portion of the two segments (in particular wall segments) or may be connectable to one or more joints connecting the segments (in particular wall segments) to each other or to a support structure, such as a strut.

In particular, when the first connection element and/or the second connection element comprises a steel clip the steel clip may be tightly attached to bolt joints on separate segments (in particular wall segments), such as separate (steel) plates of the segmented wind turbine tower wall. Thereby, the steel clips may lie in a common plane (in particular an edge defining the first bore in the first connection element may lie in a same plane or at least in a parallel plane as an edge defining the second bore in the second connection element) or they may lie in planes including an angle of more than 5°, more than 20°, more than 45°, in particular about 90°, in particular the steel clips may be twisted relative to each other by the afore mentioned angles. Thereby, depending on the application and relative arrangement of the first segment (in particular wall segment) and the second segment (in particular wall segment) the arrangement of the first connection element and/or the second connection element may be appropriately selected so as to be able to connect the first connection element to the first segment (in particular wall segment) and to connect the second connection element to the second segment (in particular wall segment) of the segmented wind turbine tower wall.

The body and/or the first connection element and/or the second connection element may be adapted or configured to generate information indicative of a relative displacement of the first connection element and the second connection element. The information may comprise visual information, audio information, and/or electric information or the like. In particular, the indicator apparatus may be adapted to expose the generated information such that the information may be perceived by maintenance personnel of the wind turbine tower.

The information may also comprise an electric signal which may be provided to a computing device and/or to a monitor over longer distances such that the information generated by the indicator apparatus may be read out or perceived at a location, such as a control room, spaced apart from the actual location of the indicator apparatus as it is mounted to the two wall segments of the wind turbine tower wall. Thus, remote monitoring of a relative displacement of two wall segments or a slip of the two wall segments may be provided.

In particular, the body may comprise a sensor for sensing relative displacement of the first segment (in particular wall segment) and the second segment (in particular wall segment) relative to each other. The sensor may comprise any measuring instrument for measuring relative distance or displacement, force, tension, pressure, and/or drag. In particular, according to an embodiment the indicator apparatus may require electric energy for operation. In other embodiments the indicator apparatus may be operated autonomously thereby requiring no external energy for operation. Thereby, a cable or conductor lead for supplying energy may be avoided, thus simplifying the construction of the indicator apparatus and also simplifying the installation of the indicator apparatus at a portion of the wind turbine tower wall.

According to an embodiment the body comprises a container. The container may for example harbour a substance for indicating the displacement of the first segment (in particular wall segment) and the second segment (in particular wall segment) relative to each other. The substance may for example comprise a powder, a liquid, a gas, an odorant substance, which induces a smell when released from the container, an explosive substance which may explode when activated, and/or the like. Thereby, an indicator substance may easily be stored within the indicator apparatus, in particular within the container.

According to an embodiment the container is configured to break, if a displacement of the first segment (in particular wall segment) and the second segment (in particular wall segment) relative to each other exceeds a predetermined amount. Thereby, according to an embodiment it may not be necessary that the container beaks completely in two parts. Instead the container may just comprise a minor crack just large enough to allow the liquid to leak. In other embodiments the container may break into two parts, a first part comprising the first connection element and a second part comprising the second connection element.

The predetermined amount may be defined as a threshold force, pressure or/and deformation applied to the container or experienced by the container, before the container breaks. The predetermined amount may be chosen depending on the application, such as a maximal tolerable displacement of adjacent wall segments of the wind turbine tower wall. According to an embodiment the maximal tolerable displacement of the two wall segments (in particular in a plane of a maximal extent of the wall segments) may amount to between 0 mm and 20 mm, in particular 1 mm and 10 mm, in particular 3 mm and 5 mm. In other embodiments, the displacement of the first segment (in particular wall segment) and the second segment (in particular wall segment) relative to each other may occur in a direction not within the plane of maximal extent of the first segment (in particular wall segment) and/or the second segment (in particular wall segment). Advantageously, when the container breaks a substance contained within the container or filled within the container may leak and may be exposed to an outside of the container. Thereby, the substance may advantageously be used as an indicator of a displacement of the first segment (in particular wall segment) and the second segment (in particular wall segment) relative to each other exceeding the predetermined amount.

According to an embodiment the container comprises a tube, in particular a glass tube. The tube may simply be manufactured and may comprise a cylindrical shape. Further, a glass tube may have a predetermined stability such as the glass tube may break when a force applied to different ends of the glass tube may exceed a threshold force or it may break when it has been deformed to an extent larger than a deformation threshold. In particular, the first connection element and the second connection element may be attached to opposing ends of the tube.

According to an embodiment the container is filled with a liquid, in particular with a coloured liquid. As mentioned above, the liquid may comprise an odorant liquid which may be exposed to the environment, if the container breaks. The smell or the odour may be noticed for example by maintenance personnel within or outside the wind turbine tower wall. However, in this case it may be difficult to identify which of the possible plural indicator apparatuses has released the odorant liquid. Thus, according to an embodiment the liquid may comprise an odorant liquid which may also be coloured. Thereby, the odour may distribute within an extended spaced around the broken container thus allowing to notice the occurrence of the breakage at a location spaced apart from the actual broken container. Thereby, maintenance personnel may for example be alarmed that a problem occurred in one of the potential plural indicator apparatuses mounted or installed at a wind turbine tower wall. Upon this alarm, the maintenance personnel may inspect the wind turbine tower wall in more detail in order to search for that indicator apparatus which triggered the alarm. That indicator apparatus that triggered the alarm may have released the odorant and coloured liquid outside the container and may have exposed the odorant coloured liquid, such that it may be visible for the maintenance personnel. Thereby, the particular indicator apparatus having triggered the alarm may be identified and localized. Thus, it may be identified between which wall segments of the wind turbine tower wall a displacement occurred which may have adverse effects on the stability of the wind turbine tower wall. A connection between the identified wall segments may then be tightened, maintained or replaced in order to remedy the problem.

According to an embodiment the body comprises a material for receiving and/or exposing a liquid leaking from the container. In particular, the material may be placed outside the container and may be arranged close to the container, such as wound around the container, in order to store/absorb/accommodate/expose/receive the liquid leaking from the container, in particular upon breakage of the container. In other embodiments the liquid may leak from the container without requiring the container to break, such as leakage from the container via a closable opening which may open upon displacement of the first segment (in particular wall segment) and the second segment (in particular wall segment) relative to each other exceeding the predetermined amount. According to another embodiment the liquid leaking from the container may be supplied to a location spaced apart from the indicator apparatus to transfer the information indicative of the relative displacement to another location.

According to an embodiment the material comprises cotton. Thereby, the liquid, in particular the coloured liquid may be stored within the cotton (in particular arranged around or close to the container) and may be exposed for visual inspection by for example maintenance personnel. According to other embodiments other fabric may be used as the material.

According to an embodiment the first connection element and/or the second connection element is adapted to be connected to the first segment (in particular wall segment) and/or the second segment (in particular wall segment) using at least one bolt. Thereby, the first connection element and/or the second connection element may in particular comprise a bore or a hole into which the bolt may be inserted. Thereby, a simple connection may be provided.

According to an embodiment a wall portion for a tower of a wind turbine is provided, wherein the wall portion comprises a first wall segment; a second wall segment fixed at the first wall segment using a joint; and an indicator apparatus according to an embodiment as described above, wherein the indicator apparatus is connected to the first wall segment using the first connection element and to the second wall segment using the second connection element.

The joint may be any type of joint for joining the first wall segment and the second wall segment. In particular, the joint may be a shear loaded bolt joint, in particular it may be constructed as either a friction type joint, a dorn type joint or a combination of the aforementioned joint types. Dorn type joints may comprise non-pre-stressed bolts where the applied load may be transferred as a shear displacement in the bolt itself. These joints may be characterized in that they have high load capacity but only little fatigue strength.

A friction type joint may comprise pre-stressed bolts where applied load may be transferred between the surfaces of the joint. These joints may be characterized in that they have little load capacity but high fatigue strength.

A combined joint, i.e. a dorn/friction type joint, is a type of joint where load is transferred both as friction between the surfaces of the joint and as a displacement in the bolt itself. The combined joint may have a maximal load capacity. As long as the load does not exceed the friction level it may also have high fatigue strength.

Typical turbine loads on a wind turbine tower may comprise small fatigue loads and may only occasionally comprise very high extreme loads. For the most operation time the high extreme load may never occur. According to an embodiment the joint is a friction type joint providing sufficient load capacity and fatigue strength.

According to an embodiment the joint is a combination of a friction type joint and a dorn type joint. In particular a plastic deformation/elongation of the bolt comprised in the combination joint may be revealed using the indicator apparatus to indicate that the pre-stress in the joint may be heavily reduced, thus requiring maintenance, tightening and/or replacement.

According to an embodiment the joint may be dimensioned as to work properly in normal operation conditions without the need for taking into account the occurrence of some possibly never occurring extreme conditions. Thereby, the joint may not be over-dimensioned, thus reducing the price of the joint. In case that extreme load conditions occur resulting in a failure or slip within the joint the problem (the slip and/or the displacement of the two segments (in particular wall segments)) may be observed due to the indicator apparatus. Thus, after seldom occurring extreme load conditions one or more joints may have failed which may then be identified using the indicator apparatus and may be maintained or replaced.

According to an embodiment the joint comprises a connection plate, wherein a first portion of the connection plate is connected by a first bolt to the first wall segment and wherein a second portion of the connection plate is connected by a second bolt to the second wall segment. Thereby, a friction type joint and/or a dorn type joint or a combination thereof may be formed. In particular, the connection plate may also be referred to as splice plate. A surface portion of the splice plate may be in direct or indirect contact with a surface portion of the first wall segment and may be pressed against this surface portion by tightening the first bolt. Another surface portion of the splice plate may be in direct or indirect contact with a surface portion of the second wall segment and may be pressed against the second wall segment by tightening the second bolt. Thereby, the first bolt and/or the second bolt may be inserted into a bore or a hole in the first wall segment and/or the second wall segment and/or the splice plate, wherein a diameter of the hole, or the holes may substantially be equal to a diameter of the bolt (thus in particular forming a dorn type joint) or may be larger than the diameter of the bolt (thereby in particular forming a friction type joint).

According to an embodiment the first connection element is connected to the first wall segment using the first bolt and the second connection element is connected to the second wall segment using the second bolt. Thereby, the indicator apparatus is connected to the first wall segment and the second wall segment via the joint. Thereby, a simple connection mechanism of the indicator apparatus is provided. Further, the indicator apparatus may advantageously indicate a relative displacement of two bolts comprised in the joint which in turn may indicate that a relative displacement of the first wall segment and the second wall segment occurred.

According to an embodiment the first wall segment and the second wall segment are arranged side by side. In particular, the first wall segment and the second wall segment may not overlap. In particular, the first wall segment may have a first main surface extending in two lateral directions defined by a maximal extent of the first wall segment and the second wall segment may comprise a second main surface extending in two lateral directions defined by a maximal extent of the second wall segment. The first main surface and the second main surface (or planes including the surfaces) may include an angle equal or larger than 0°, larger than 10°, larger than 20°, greater than 40°, in particular around 40°. All these arrangements may be adopted when the first wall segment and the second wall segment are arranged side by side. In particular, a lateral edge of the first wall segment may abut or may be (immediately) adjacent a lateral edge of the second wall segment.

According to an embodiment a tower wall of a wind turbine tower is provided wherein the tower wall comprises a plurality of wall portions according to an embodiment as described above, wherein the indicator apparatus is connected to interior portions of the first wall segment and the second wall segment. The interior portions of the first wall segment and the second wall segment are arranged at an inside of the turbine tower. Thereby, the information indicative of the relative displacement of the first connection element and the second connection element may be exposed to an inside of the turbine tower. Thereby, maintenance personnel may easily monitor that the not tolerable displacement between the two segments (in particular wall segments) occurred.

It should be understood that features which have been disclosed in respect to the indicator apparatus may also be applied to the wall portion for a tower of a wind turbine and to a tower wall of a wind turbine tower. Further, it is understood that the features (individually or in combination) disclosed in respect to either the indicator apparatus, the wall portion or the tower wall may be applied to a method for operating the indicator apparatus.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
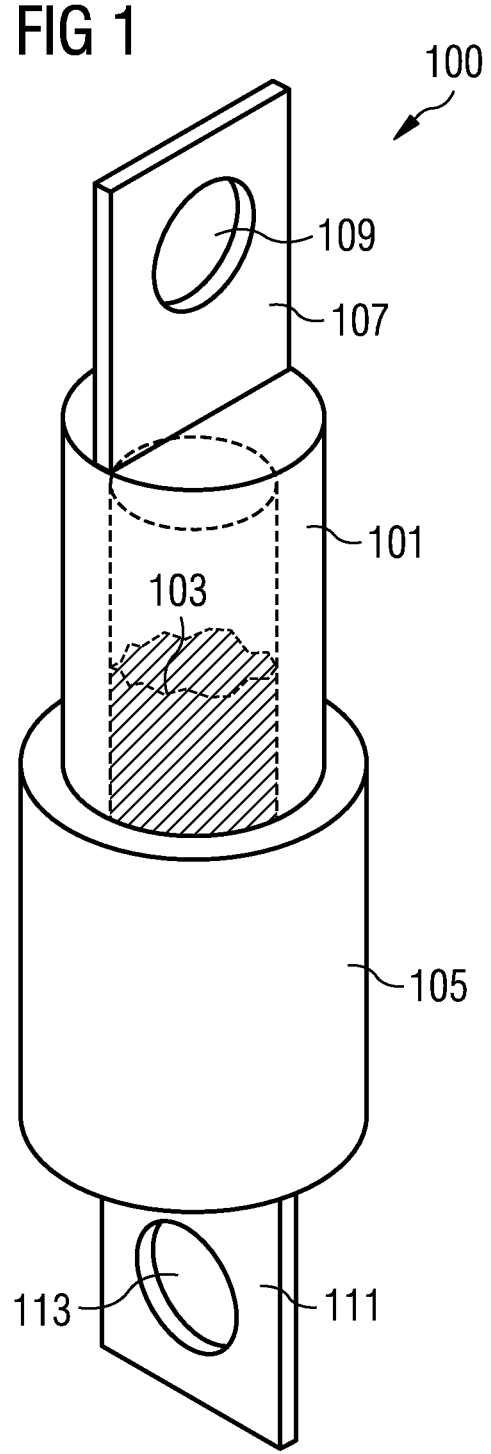
FIG. 1 schematically illustrates a perspective view of an indicator apparatus according to an embodiment.

The illustration in the drawing is schematically. It is noted that in different figures, similar or identical elements are provided with the same reference signs or with reference signs, which are different from the corresponding reference signs only within the first digit. Thereby, elements, components and/or method steps similar in structure and/or function are denoted by reference signs differing only in the first position. As far as an element, a component, or a method step is not described in detail with respect to a particular embodiment the description of the corresponding element, component, or method step with respect to another embodiment may serve as an auxiliary description for this element, component, or method step in the particular embodiment.

FIG. 1 schematically illustrates a perspective view of an indicator apparatus 100 according to an embodiment. The indicator apparatus 100 comprises a body 101 which is in the illustrated embodiment formed as a glass tube. The glass tube 101 is filled with a coloured liquid 103. The glass tube 101 is surrounded by an absorbing material 105, such as cotton, in the illustrated embodiment formed as a ring of fabric, in particular a cylindrical ring of fabric.

The indicator apparatus 100 further comprises at one end of the glass tube 101 a first steel clip 107 being formed by a metal plate having a bore 109. The steel clip 107 having the bore 109 forms a connection element which is adapted to be connected to a wall segment of a wind turbine tower wall. In particular, the steel clip 107 may be attached to a bolt joint joining two segments of the wind turbine tower by inserting the bolt into the bore 109 and tightening it.

The indicator apparatus 100 illustrated in FIG. 1 further comprises a second steel clip 111 also having a bore 113. The second steel clip 111 is mounted at another end of the glass tube 101. As the first steel clip 107 also the second steel clip 111 is formed by a metal plate having the bore 113. In the illustrated embodiment the first steel clip 107 defines a plane which includes an angle of about 90° with a plane defined by the steel clip 111 such that the steel clips are twisted. Thereby, the connection of the first steel clip to a first wall segment of a wind turbine tower wall and the connection of the second steel clip 111 to a second wall segment of a wind turbine tower wall may be facilitated. In other embodiments the planes defined by the first steel clip 107 and the second steel clip 111 may be oriented parallel to each other or may even lie in one common plane.

The glass tube 101 is adapted to break, if a tension, a drag, and/or a force applied to the glass tube 101 and/or a deformation/elongation/compression experienced by the glass tube 101 exceeds a predetermined amount. Thereby, the tension, drag, compression, elongation, and/or force may be mediated via the first steel clip 107 and the second steel clip 111 towards the glass tube 101.

Figure 2:
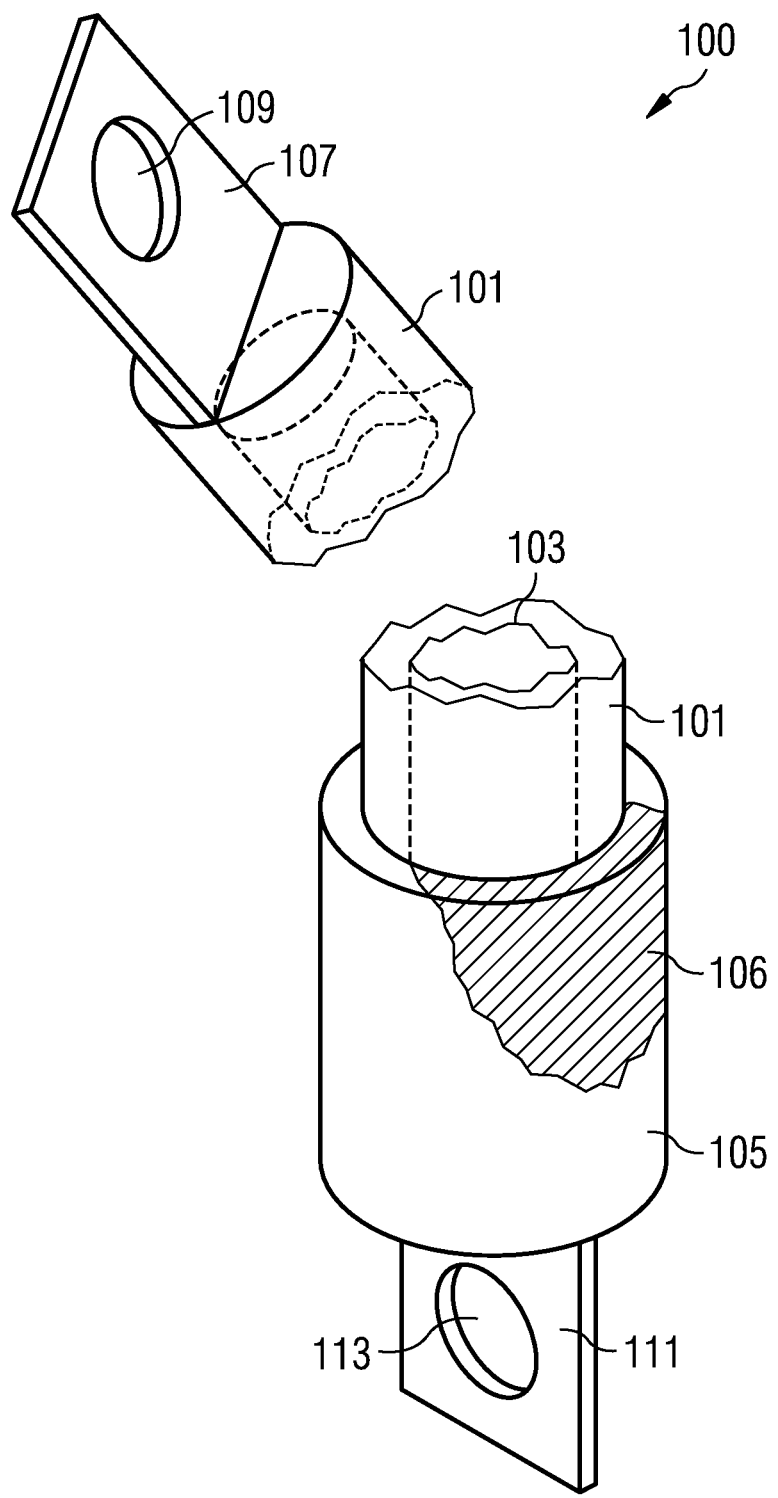
FIG. 2 schematically illustrates the indicator apparatus illustrated in FIG. 1 after breakage.

FIG. 2 illustrates the indicator apparatus 100 illustrated in FIG. 1 in a state when the glass tube 101 is broken due to a tension, drag, force, compression, and/or elongation of the glass tube exceeding a predetermined amount. After breakage of the glass tube 101 the coloured liquid 103 leaks out of the glass tube 101 and is distributed upon the absorbing material 105 in a region 106, wherein the absorbing material 105 receives the coloured liquid 103 and exposes the coloured liquid 103 to an outside of the glass tube 101.

The coloured liquid 105 exposed in the region 106 may serve as an indication that a drag, force, tension, compression, elongation, and/or deformation experienced by or applied to the first steel clip 107 and the second steel clip 111 occurred exceeding a predetermined amount. This situation may in particular have occurred when the indicator apparatus 100 illustrated in FIGS. 1 and 2 is mounted using the first steel clip 107 to a first wall segment 115 and is mounted using the second steel clip 111 to a second wall segment 117, as is illustrated in FIG. 3 schematically illustrating a wall portion 120 for a tower of a wind turbine.

When in use, in particular mounted at different wall portions of a wind turbine, the indicator apparatus 100 may not fall completely apart and may not be separated as illustrated in FIG. 2 but may break only to present a crack into the glass tube 101 such that the coloured liquid 103 may leak from the glass tube 101 (such as through a small gap or fracture or cleft) to be exposed at the absorbing material 105 at the region 106.

Figure 3:
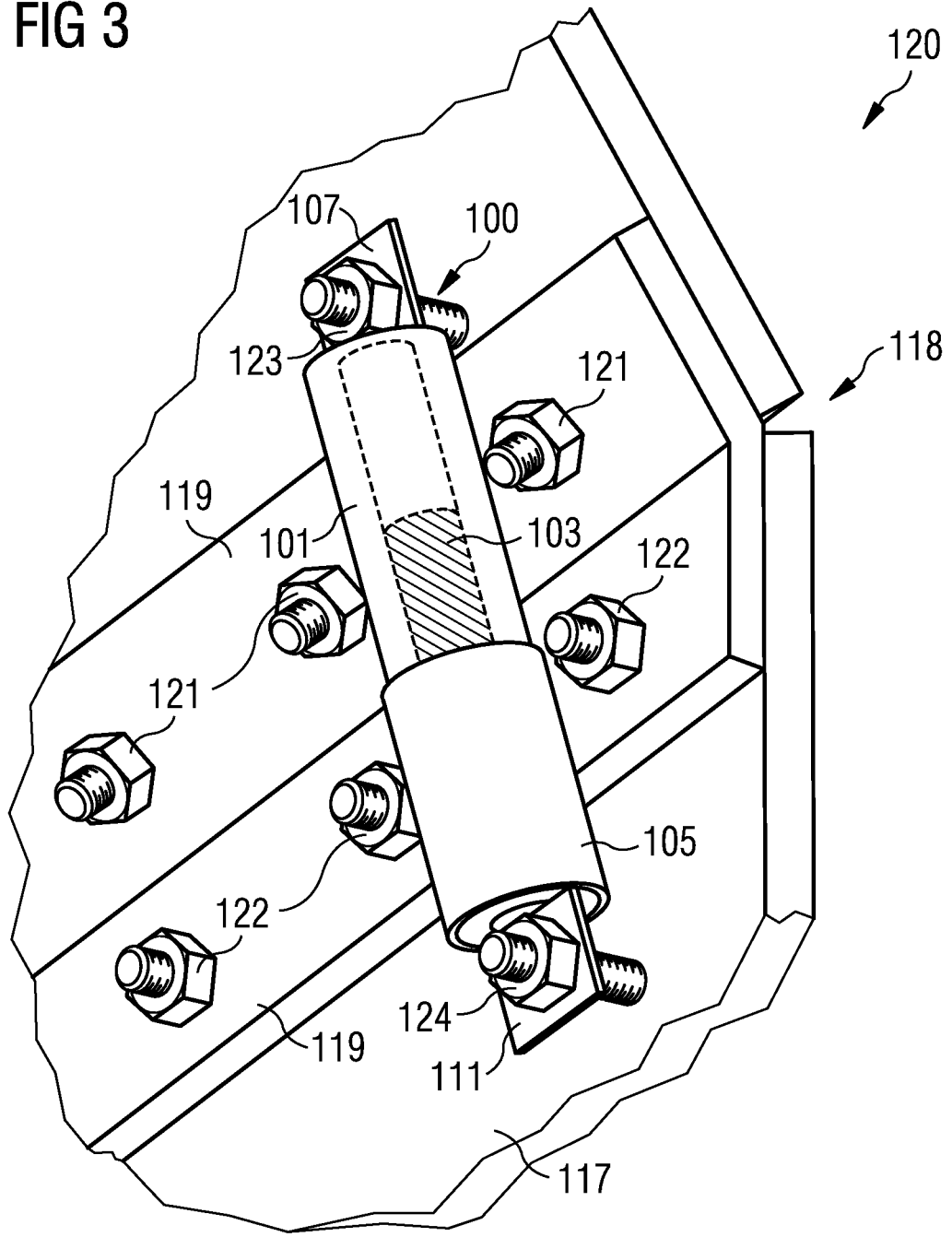
FIG. 3 schematically illustrates a wall segment for a tower of a wind turbine according to an embodiment comprising the indicator apparatus illustrated in FIGS. 1 and 2.

In the embodiment illustrated in FIG. 3 the first wall portion 115 is connected to the second wall portion 117 using a joint 118. Thereby, the joint 118 is a friction type joint comprising a splice plate 119 and bolts 121 and 122 each having a nut. A surface portion of the splice plate 119 is in direct contact with a surface portion of the first wall segment 115 and is pressed against the first wall segment 115 by tightening the bolts 121. Another surface portion of the splice plate 119 is in direct contact with a surface portion of the second wall segment 117 and is pressed against the second wall segment 117 by tightening the bolts 122. The illustrated embodiment of the wall portion 120 is adapted for assembling a polygonal wind turbine tower wall, wherein the wall segments 115, 117 are arranged side by side, wherein a main surface of the first wall segment 115 includes an angle with a main surface of the second wall segment 117, wherein the angle is about 40°.

For indicating a displacement of the first wall segment 115 and the second wall segment 117 relative to each other, the indicator apparatus 100 illustrated in FIG. 1 is inserted between the bolts 123, 124 by connecting the first steel clip 107 to the bolt 123 and by connecting the second steel clip 111 to the bolt 124, wherein the bolt 123 is tightened to the first wall segment 115 and the bolt 124 is tightened to the second wall segment 117.

In other embodiments the indicator apparatus 100 may be connected using the steel clip 107 to the splice plate 119 and may be connected using the steel clip 111 to the second wall segment 117, to monitor and indicate relative displacement between the splice plate 119 and the second wall segment 117.

In still other embodiments the indicator apparatus 100 may be connected using the steel clip 107 to the splice plate 119 and may be connected using the steel clip 111 to the first wall segment 115, to monitor and indicate relative displacement between the splice plate 119 and the first wall segment 115.

Returning to the embodiment illustrated in FIG. 3, upon a relative displacement of the first wall segment 115 and the second wall segment 117, the glass tube 101 of the indicator apparatus 100 will break (when the displacement exceeds a predetermined amount) and will release the coloured liquid 103 to be absorbed or received by the cotton bandage 105 and to be exposed in region 106 to an exterior of the glass tube 101. The cotton saturated or soaked by the coloured liquid may then provide a visual information that a failure of the joint 118 occurred. Upon monitoring this indication the joint 118 may then be examined in detail and may be fixed, tightened or replaced depending on the cause of the problem. Thereby, the stability of a wind turbine tower wall comprising the wall segment 120 illustrated in FIG. 3 may be maintained.

Figure 4:
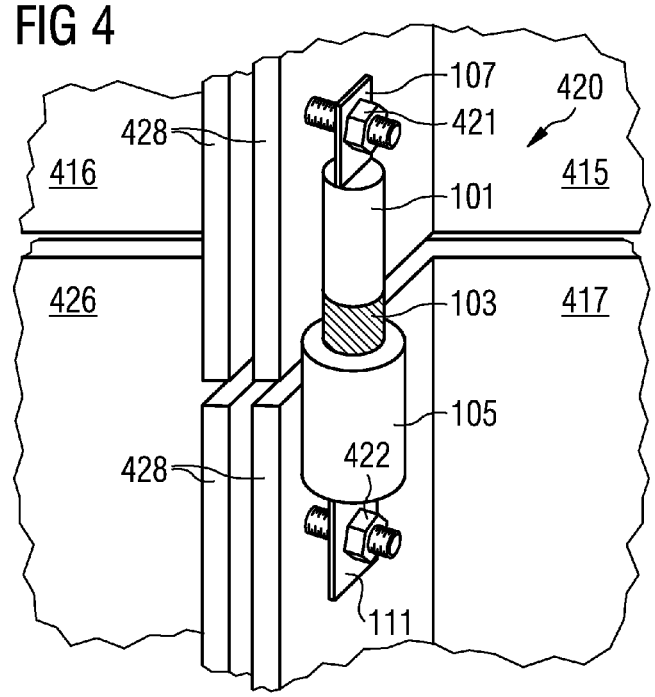
FIG. 4 schematically illustrates a wall segment for a tower of a wind turbine according to an embodiment comprising the indicator apparatus illustrated in FIGS. 1 and 2.

FIG. 4 schematically illustrates a wall segment 420 for a tower of a wind turbine according to an embodiment comprising the indicator apparatus illustrated in FIGS. 1 and 2, wherein four wall portions 415, 416, 417 and 426 are connected to form a wall segment 420. Each wall portion 415, 416, 417 and 426 comprises a flange 428, wherein the wall portions 415, 416 are connected to each other (using a bolt 421) along vertical connections via pairs of flanges 428, which protrude inwards (into an inside of the tower) and wherein also the wall portions 417, 426 are connected to each other (using a bolt 422) along vertical connections via pairs of flanges 428, which protrude inwards (into an inside of the tower).

The indicator apparatus 100 is connected to the wall portion 415 at its steel clip 107 via the bolt 421 and is connected to the wall portion 417 at its steel clip 111 via the bolt 422. A relative displacement of the wall portions 415, 417 (connected to each other using a not illustrated horizontal connection) may be indicated upon breakage of the glass tube 101, as the coloured liquid 105 leaks from the glass tube and is exposed at the material 105.

Figure 5:
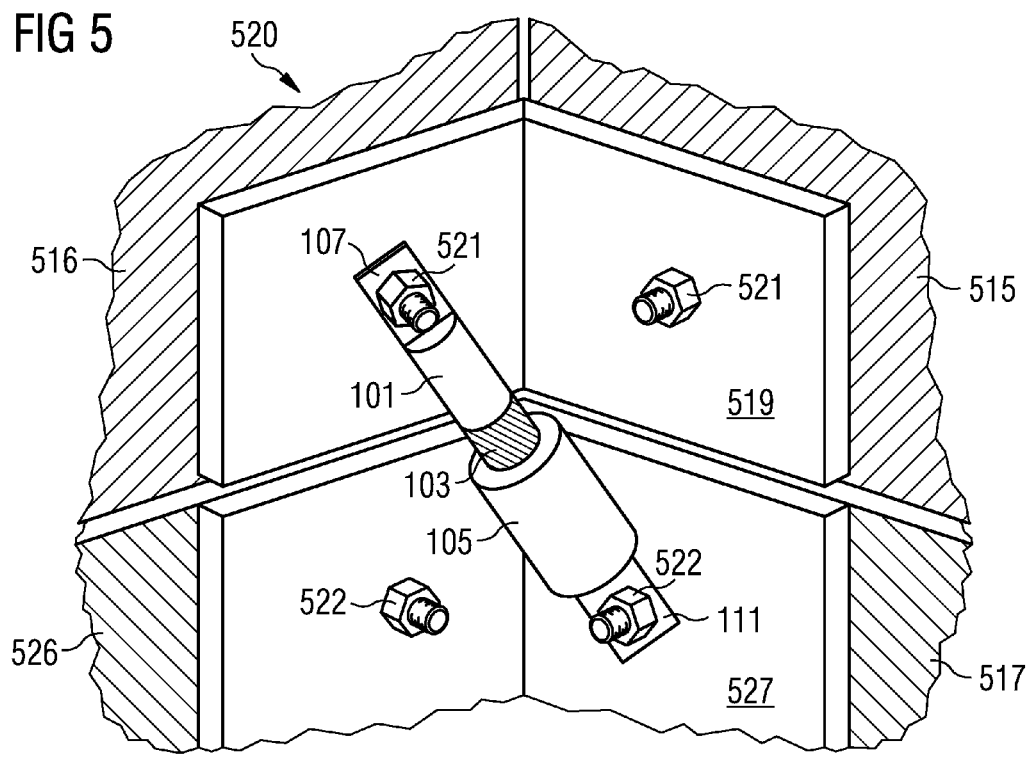
FIG. 5 schematically illustrates another wall segment for a tower of a wind turbine according to an embodiment comprising the indicator apparatus illustrated in FIGS. 1 and 2.

FIG. 5 schematically illustrates another wall segment 520 for a tower of a wind turbine according to an embodiment comprising the indicator apparatus illustrated in FIGS. 1 and 2, wherein wall portions 515, 516 are connected using a splice plate 519 via bolts 521 providing a vertical connection and wherein wall portions 517, 526 are connected using a splice plate 527 via bolts 522 also providing a vertical connection.

The indicator apparatus 100 is connected to the wall portion 516 at its steel clip 107 via the bolt 521 and is connected to the wall portion 517 at its steel clip 111 via the bolt 522 for indicating a relative displacement of wall portions 517, 516 as described in detail above.

In other embodiments the indication apparatus may (directly or indirectly) be connected to different wall portions in another manner.

In particular, in case of loads exceeding a friction level of the bolts 121, 122 the segments 115, 117, in particular steel plates, and also thereby the joints 118 may slip. Hereby, the glass tube 101 may break or crack and the contained colour liquid 103 may leak. In the case the glass tube is contained in an absorbing material 105 this material may absorb the liquid 103 and will itself be coloured. The coloured material 105 may be easily visible from e.g. an internal ladder or a service lift and an easy visual slip indicator may be provided.

With the present slip indicator or indicator apparatus for indicating a displacement of two wall segments it may be possible to dimension a friction joint to all normal operation conditions and as a combined joint to extreme loads. If the extreme load occurs inducing slip in the joint, the indicator may be released indicating that the joint has to be tightened or replaced upon the next planned service.

One advantage of the indicator apparatus 100 illustrated in FIG. 1 may be that it may be mass-produced to a very low price. Another advantage of the use of such an indicator may be that a planned or regular tightening of the joints can be avoided i.e. the indicator may indicate whether tightening is needed or not, thus simplifying maintenance of the wind turbine.

Yet another advantage of the indicator apparatus 100 illustrated in FIG. 1 may be that the number of bolts in joints may be reduced, where extreme loads seldom occur. Further, it may be possible to easily connect empirical data on how often slip or displacement occurs, whereby in turn the construction of the tower wall may be adapted accordingly.

The indicator apparatus 100 illustrated in FIG. 1 may also be used on joints other than in the tower wall, such as in a hub/spinner plate connection, connection between hub and main shaft, connection between hub and generator (for direct-drive type wind turbines) etc.

For various embodiments the steel clips of the indicator apparatus may be angled in order to fit the joints to which it is to be connected.

For various embodiments the indicator apparatus may comprise a further protective shell surrounding the already described components with the function of protecting the components against environmental influences such as humidity, dust, oil, grease, etc.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A wall portion for a tower of a wind turbine, the wall portion comprising:
a first wall segment;
a second wall segment fixed at the first wall via a joint; and
an indicator apparatus, the indicator apparatus comprising;
a body;
a first connection element mounted at the body and adapted to be connected to the first wall segment;
a second connection element mounted at the body and adapted to be connected to a second segment wall segment,
wherein the body is configured to generate information indicative of a relative displacement of the first connection element and the second connection element, and
wherein the indicator apparatus is connected to the first wall segment using the first connection element and to the second wall segment using the second connection element.

2. The wall portion according to claim 1,
wherein the joint comprises a connection plate,
wherein a first portion of the connection plate is connected by a first bolt to the first wall segment, and
a second portion of the connection plate is connected by a second bolt to the second wall segment.

3. The wall portion according to claim 1,
wherein the first connection element is connected to the first wall segment using the first bolt and the second connection element is connected to the second wall segment using the second bolt.

4. The wall portion according to claim 1,
wherein the first wall segment and the second wall segment are arranged side by side.

5. A tower wall of a wind turbine tower, comprising a plurality of wall portions according to one of claim 1,
wherein the indicator apparatus is connected to interior portions of the first wall segment and the second wall segment.

\* \* \* \* \*